(No Model.)
E. KELLY.
DRUGGIST'S WEIGHING SCALE.
No. 517,698. Patented Apr. 3, 1894.
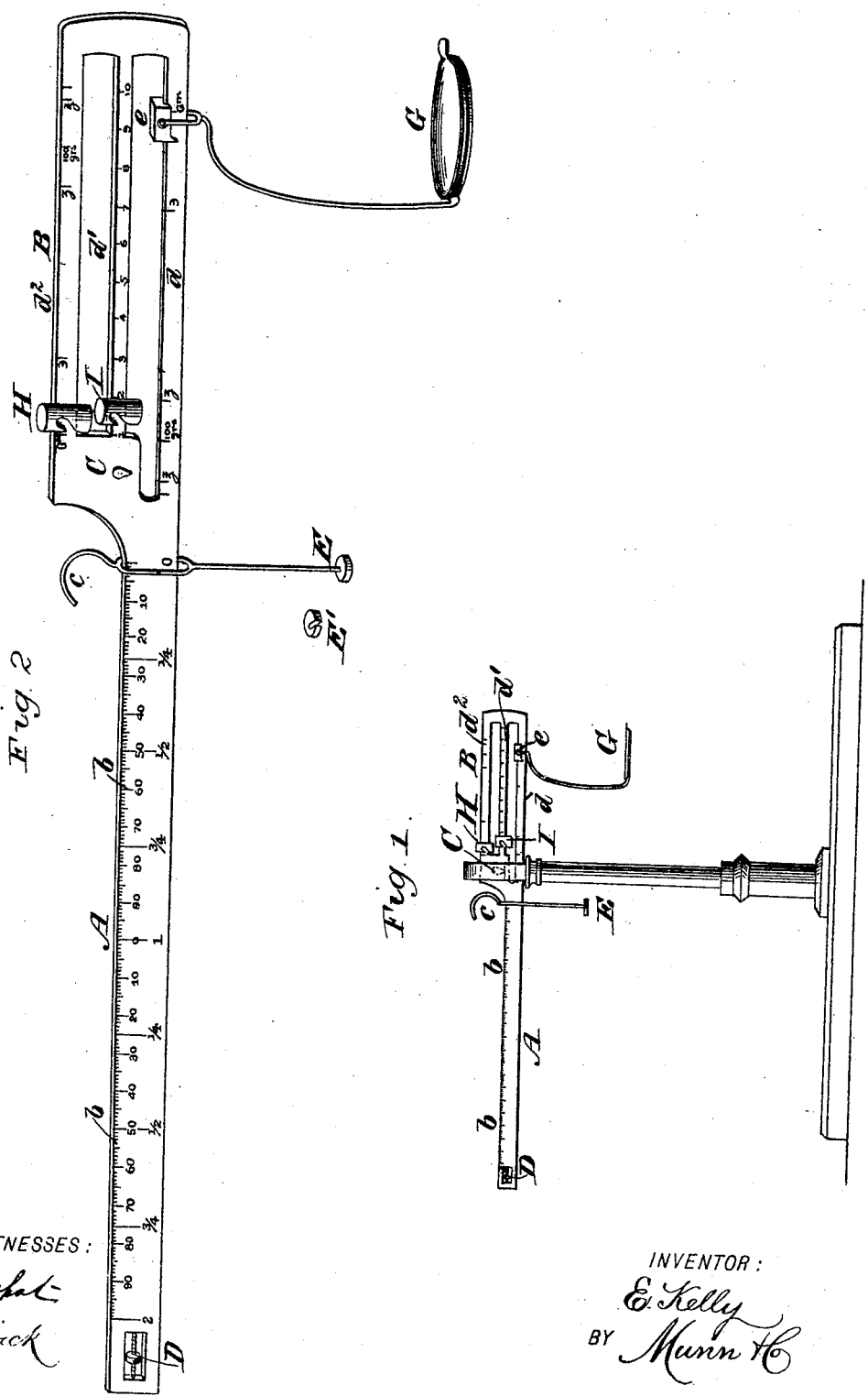
WITNESSES:
Paul Johat
C. Sedgwick
INVENTOR:
E. Kelly
BY Munn & Co.
ATTORNEYS

United States Patent Office.

EDWARD KELLY, OF LEBANON, KENTUCKY.

DRUGGIST'S WEIGHING-SCALE.

SPECIFICATION forming part of Letters Patent No. 517,698, dated April 3, 1894.

Application filed October 28, 1891. Serial No. 410,083. (No model.)

*To all whom it may concern:*

Be it known that I, EDWARD KELLY, of Lebanon, in the county of Marion and State of Kentucky, have invented an Improvement in Weighing-Scales, of which the following is a full, clear, and exact description.

This invention, while it is more especially designed to be applied to a druggist's prescription scale and is here represented as so applied, is equally applicable to other forms of weighing scales.

The improvement upon which the invention is claimed, is, an improvement in the use in weighing scales, of the principle of weighing the various denominations of different systems of weight (as United States apothecaries' and metric systems) with the same sliding poise and the same series of marking on the poise arm or weighing arm of the scale beam, by altering the distance between the load and the fulcrum of the beam, that is, by altering the length of the load arm, which improvement consists, in the employment on the scale beam, of a movable load carrying pan or support and a special movable counterbalance weight therefor, by means of which, conjointly, the distance between the load and the fulcrum of the beam may be variously altered and the equilibrium of the scale beam maintained.

The invention also embraces the employment in scales of a sliding poise variable with respect to its weight with a compensating balance weight or, in other words, the principle of weighing by means of altering the weight of the sliding poise and balancing the scale-beam with the weight of the sliding poise thus altered, by means of a special balance weight, and then weighing the load in the scale pan by altering the position of the sliding poise upon the weighing arm of the scale beam. And the invention further includes a finger hold or piece upon the sliding beam-poise.

These features of the invention will now be more particularly described and specifically pointed out in the claims.

Reference is to be had to the accompanying drawings, forming a part of this specification, in which similar letters of reference indicate corresponding parts in both the figures.

Figure 1 represents a side elevation of a scale embodying my invention; and Fig. 2, a longitudinal view in perspective, of the beam of the scale, its sectional sliding poise, weighing pan and balance weights.

A, is the weighing arm or poise arm of the beam, and B, its load's arm or portion, with arms for special balance weights, C, being the fulcrum or knife edge, upon which the scale beam is balanced on any suitable frame or support.

The weighing arm A, is shown as marked off into two main divisions indicated by the numbers or figures 1 and 2 thereon, the first division marked 1, being innermost, and each of which is sub-divided into one hundred equal parts, as shown at $b, b$. D is a screw balancing poise at the outer end of said arm A, for adjusting the scale to keep it in perfect balance.

E, is the sliding poise on the arm A, provided with a bent finger piece, $c$, attached to its upper part, and pointing to the side of the weight, to facilitate the lifting and moving of the weight on the beam; and E' is a slotted additional or removable weight, of which there may be any number, to be used on or removed from the sliding poise E, when it is required to increase or diminish the weight of said sliding poise.

The load's arm or portion B, of the beam, is divided into three longitudinal minor beams $d, d', d^2$, here shown as arranged one above or below the other, but they might be arranged, if desired, side by side, especially the minor beams $d', d^2$. The minor beam $d$ carries a slide $e$, to which is suspended the frame that holds the removable scale pan G. This slide $e$, is provided with a lower pointer so that it can be placed exactly at different points of division on the beam $d$, upon which the slide moves, and may be located at any desired point. Said points of division on the beam $d$, are marked with characters representing different denominations of weight, as shown in Fig. 2.

The minor beam $d^2$, is provided with a balance poise H, fitted to slide thereon and having a pointer to indicate different points on said beam, to which said balance poise is adjusted. These points of division on the beam $d^2$, are marked with characters representing different denominations of weight, similar to those marked on the minor beam $d$. Similar characters on the respective beams $d$ and $d^2$ represent points at which, if the slide $e$ and balance poise H are placed at the same time, the scale will remain balanced. The minor beam $d'$, is also provided with a sliding balance poise I, carrying a pointer. This beam $d'$ is marked with divisions, indicated by the numbers 1, 2, 3, and so on up to 10, the numerical order increasing away from the fulcrum C.

The balance poise I, is of such weight and the divisions 1, 2, 3, &c., are at such distance from fulcrum C, that balance poise I, at division 1 on minor beam $d'$ will balance poise E at division 0, on arm A; and balance poise I, at division 2 on minor beam $d'$, will balance poise E at division 0, on arm A, when said poise E is doubled in weight by the addition of the slotted additional weight E'; and the balance poise I at division 3 on minor beam $d'$ will balance poise E at division 0, on arm A, when said poise E is increased three times in weight by the addition of another slotted weight similar to slotted weight E'; and so on.

To explain the operation of the scale, let Fig. 2 of the accompanying drawings, represent a scale-beam, in which the length of the poise's arm A and load's arm B and the weights, of poise E and balance-poises H and I, and slide $e$ carrying the scale-pan G, are so proportioned to each other that, when poise E is at point marked $o$ on poise's arm A, and slide $e$ is at point marked Gm. on minor beam $d$ of load's arm B, and balance poise I is at point marked 1 on minor beam $d'$, and balance poise H is at point marked Gm. on minor beam $d^2$, the scale beam will balance on knife edge of fulcrum C. And let the weights of slide $e$, with scale-pan G, and balance poise H, be so proportioned to each other and the points marked with the characters Gm., ℈, ʒ, 100, gn., ℥ so located on minor beams $d$ and $d^2$ respectively, that if slide $e$ and balance poise H, are simultaneously placed at points marked by similar characters on their respective beams $d$ and $d^2$, the scale beam will remain balanced. Now let poise E be of such weight that, when placed out on poise's arm A, to the point marked 1, it will balance one gram (metric) placed in the scale pan G, when the slide $e$ is at point on arm $d$ marked Gm.; and with poise and loaded scale pan at these points on their respective arms of the scale beam, let weight of poise equal 1, and length of poise's arm equal 1, and length of load's arm equal 1. Then, as the fundamental rule in the balance is, that poise times poise's arm equals load times load's arm, the weight of the load in the scale pan (one gram) will equal 1. This may be represented by the equation; 1 (poise's arm) times 1 (poise) equals 1 (load's arm) times 1 (load). If now we shorten load's arm by placing the slide $e$ of scale pan G at a point one fourth ($\frac{1}{4}$) of the distance from fulcrum C to point Gm. on arm $d$ (approximately at point marked 3) and at the same time preserve the equilibrium of the scale beam by placing the balance poise H at such a point on the arm $d^2$ as will accomplish this (approximately at point marked 3), then, poise E at point 1 on poise's arm A, will balance four grams placed in scale-pan G; because we have now converted the scale beam, which maintained its equilibrium with the load's arm B, equal to 1, into a scale beam which maintains its equilibrium with the load's arm B equal to $\frac{1}{4}$, (the poise's arm A, poise E, and scale pan G, remaining the same); hence, any movement of poise E out on poise's arm A, will now balance four (4) times more load in scale pan G. Therefore, if poise be placed at point 1 on poise's arm A, then the poise's arm being equal to 1, poise equal to 1 and load's arm equal to $\frac{1}{4}$, in order for the beam to balance the load placed in scale pan G must be equal to 4 (or four grams), because poise (1) times poise's arm (1) must be equal to load (4) times load's arm ($\frac{1}{4}$.) And in this manner, in the scale represented by accompanying drawings, the load's arm B may be so proportioned to poise's arm A, by placing slide $e$ at points on minor arm $d$ marked Gm., ℈, ʒ, 100 gn., ℥ (the equilibrium of the scale beam being maintained by movements of the balance poise H upon minor beam $d^2$, as above described), that poise E, when placed at point 1 on arm A, will balance one gram, one scruple, one dram, one hundred grains or one ounce, placed in the scale pan G; and when placed at any fractional sub-division or any multiple of one, represented on the arm A, the poise E will balance that fractional part or multiple of one gram, one scruple, one dram, one hundred grains, or one ounce, as the case may be, when placed in the scale pan G. Thus, each of the minor sub-divisions (one one-hundredth) on the weighing arm A, may be made to represent one centigram (one one-hundredth of one gram) or one grain (one one-hundredth of one hundred grains.)

It will be observed that in order for poise E, when placed at one definite point (as 1) on arm A, to balance, as indicated above, various weights placed in the scale pan G, it is necessary for the equilibrium of the scale beam, with poise E at 0 on the arm A, to be obtained after each alteration of position of the slide $e$ upon its arm $d$. In the scale represented by accompanying drawings, this is accomplished by placing the balance weight H at such a point on its beam $d^2$, as will cause it to counterbalance the disturbance of equilibrium of the scale beam, produced by such alteration of position of slide $e$; but the marking with similar characters of the points on the arms $d$ and $d^2$ at which the slide $e$ and the balance poise H may be simultaneously placed and the equilibrium of the beam with poise E at 0 on the arm A, remain undisturbed, obviates the necessity of placing poise E at 0 on arm A and balancing the beam with balance poise H, after each alteration of the position of slide $e$. Furthermore, by increasing or diminishing the weight of the poise E and at the same time preserving the equilibrium of the scale beam with the poise E, (thus increased or diminished in weight) at 0 on the arm A, the divisions on the weighing arm A may be made to indicate a correspondingly increased or diminished number of units of weight. To illustrate: let the slide $e$ and balance poise H be so adjusted that the poise E when placed at 1 on arm A will balance one gram in the scale pan G, and let poise be now equal to 1, poise's arm equal to 1, load (one gram) equal 1 and load's arm equal to 1. If now the poise E be exactly doubled in weight by the addition of the slotted weight E', and the balance poise I be placed at such a point on its arm $d'$ as to preserve the equilibrium of the scale beam with the poise (now consisting of E and E' at 0 on arm A, said poise when placed at 1 on arm A will balance two grams in the scale pan G; because, we have now converted the scale beam which maintained its equilibrium with the poise equal to 1, into a scale beam which maintains its equilibrium with the poise equal to 2 (the poise's arm, load's arm and load carrying scale pan remaining the same), hence any movement of the poise out on the poise's arm A will now balance two times more weight in scale pan G and, therefore, if poise be placed at 1 on arm A, then, poise being equal to 2, poise's arm equal to 1 and load's arm equal to 1, the load placed in scale pan G must be equal to 2 (two grams) in order for the beam to balance, because poise (2) times poise's arm (1) equals load (2) times load's arm (1). And poise now placed at any fractional sub-division or multiple of 1 represented on arm A, will balance that fractional part or multiple of two grams placed in the scale pan G. The above holds equally true if the weight of the poise E be increased any number of times and if the scale be adjusted to weigh any other denomination of weight than grams.

In the scale represented in the accompanying drawings, the marking of the arm $d'$ with the points 2, 3, &c., at which the balance poise I, will balance poise E at 0 on arm A, when said poise E is increased two, three, &c., times in weight, obviates the necessity of placing poise E at 0 and balancing the beam, each time the weight of said poise is changed. This principle of weighing different multiples or fractions of a given denomination of weight, by increasing or diminishing the weight of the sliding poise and at the same time preserving the equilibrium of scale beam, may be applied to any scale in which a sliding weighing-poise is used.

The prescription scale, herein represented, furnishes to the apothecary a scale with which he may weigh the various denominations of both the metric and apothecaries' (United States) systems of weights, with one weighing poise and one series of markings on the weighing arm of the scale beam, as shown above. And with this scale the equivalent in the United States apothecaries' system of any denomination of weight of the metric system, (or vice versa) may be readily ascertained without calculation. Thus, if it is desired to know the equivalent in grains, of twenty-three centigrams, let the slide $e$ and balance weight H be so adjusted that the poise E when placed at 1 on arm A, will balance one gram in the scale pan G, and then, by means of the minor sub-divisions on the arm A, which now represent centigrams, weigh twenty-three centigrams of some substance still in the scale pan, adjust the slide $e$ and balance weight H so that the poise E, when placed at 1 on arm A, will balance one hundred grains in the scale pan G, then, each of the minor sub-divisions on the arm A will represent one grain, and the point on the arm A, at which poise E will balance the twenty-three centigrams in the scale pan, will show the equivalent in grains of the said twenty-three centigrams. And so with other denominations of either system.

Having thus described my invention, I claim as new and desire to secure by Letters Patent—

1. In weighing scales, an improvement, in the method of weighing different denominations of weight by altering the distance between the load and the fulcrum of the beam, which improvement consists, in the employment on the scale beam of a movable load carrying pan or support, conjointly with a movable counterbalance weight therefor, by means of which the equilibrium of the scale beam may be maintained after any movement of said load carrying pan or support, substantially as described.

2. The herein described method of weighing different denominations of weight consisting in employing a longitudinally movable poise, and a longitudinally movable counterbalance weight therefor, altering the weight of the poise to increase or diminish its weighing power as required and moving the counterbalance to compensate for the change in the value of the poise and thus balance the scale, substantially as described.

3. In a weighing scale, the combination of the scale beam, having its weighing arm A, on one side of its fulcrum C, sectionally divided or marked and each section sub-divided or marked with one hundred equal parts or points $b$, $b$, and its load's arm B constructed to form distinct minor beams $d$, $d'$, $d^2$, the one of which $d'$ is marked with ten points or divisions and the others $d$ and $d^2$ are graduated and marked with like symbols of weight, the sectional sliding poise E on arm A, the balance weights H and I fitted to slide on minor arms $d^2$ and $d'$, and the slide $e$ on minor arm $d$, carrying the scale pan G, substantially as and for the purposes herein specified.

4. In weighing scales, a scale beam, a longitudinally movable poise, a longitudinally movable load pan or support, and a longitudinally movable counterbalance weight on the load's arm of the scale beam for balancing the scale to the different positions of the load pan or support, in combination, substantially as described.

5. In weighing scales, a scale beam, a longitudinally movable poise on the poise arm of the beam, separate weights adapted to the poise for increasing and diminishing the value of the poise, a load pan on load's arm of the beam, and a movable counterbalance weight on load's arm, for balancing the beam as the value of the poise is altered, substantially as described.

6. In weighing scales, a scale beam, a longitudinally movable poise adapted to receive weights, a longitudinally movable counterbalance for balancing the scale to the different weights of the poise, a longitudinally movable load carrying pan or support, and a longitudinally movable counterbalance weight for balancing the scale beam to the different positions of the load pan or support, in combination, substantially as described.

EDWARD KELLY.

Witnesses:
R. B. EDMONDS,
J. A. KELLY.